United States Patent Office 3,030,328
Patented Apr. 17, 1962

3,030,328
COMPOSITION COMPRISING A FLUOROCARBON COPOLYMER MIXED WITH A FLUOROALCOHOL ESTER OF A CYCLIC POLYCARBOXYLIC ACID
Robert Salim Mallouk, Wilmington, Del., assignor to E. I. du Pont de Nemours and Company, Wilmington, Del., a corporation of Delaware
No Drawing. Filed July 13, 1959, Ser. No. 826,423
5 Claims. (Cl. 260—31.8)

The present invention relates to plasticized polymers, and, more particularly, to plasticized fluorocarbon copolymers.

Fluorocarbon copolymers, particularly copolymers of tetrafluoroethylene and substantially fluorinated α-olefins, constitute a class of resins which have many physical properties comparable to polytetrafluoroethylene. Polytetrafluoroethylene is well known for its superior corrosion resistance, thermal stability and toughness. The copolymers of tetrafluoroethylene and fluorinated α-olefins differ from the homopolymer in the extremely significant property of melt flow. Whereas polytetrafluoroethylene has no melt flow and forms a brittle gel at temperatures above the crystalline melting point, the copolymers of tetrafluoroethylene and fluorinated α-olefins become viscous liquids at temperatures above the melting point. The fabrication of polytetrafluoroethylene has, therefore, required the development of unique techniques in the plastics fabrication field, such as the preforming and free-sintering technique or the paste extrusion technique, which are well described in the literature. The copolymers, on the other hand, because of their melt flow, can be fabricated by techniques such as melt extrusion or injection molding, which are standard fabrication methods for high molecular weight thermoplastic resins.

The improvement in melt flow, however, was not obtained without some decrease in the mechanical properties at elevated temperatures, and also some decrease in overall toughness of the polymer. The present invention contemplates an increase in toughness without a decrease in melt flow or an increase in melt flow without a decrease in toughness.

It is therefore one of the objects of the present invention to prepare improved fluorocarbon polymer compositions. It is another object to prepare plasticized fluorocarbon polymer compositions. A further object of the present invention is to prepare plasticized fluorocarbon polymer compositions, improved in toughness and melt flow as compared to the unplasticized composition. Other objects will become apparent hereinafter.

The objects of the present invention are accomplished by a composition which comprises a fluorocarbon copolymer of tetrafluoroethylene and a fluorinated α-olefin having the general formula $CF_2=CFC_nF_{2n}X$, where $n$ is an integer from 1 to 10 inclusive, and X is from the class consisting of hydrogen and fluorine and from 1 to 40%, based on the weight of the copolymer, of an ester of a cyclic polycarboxylic acid containing from 2 to 6 carboxylic acid groups, wherein the ester radical has the general formula $-OCH_2-C_nF_{2n}CF_2H$, $n$ being an integer of from 3 to 7. In accordance with the present invention, it was discovered that the esters of fluoroalcohols with cyclic polycarboxylic acids, when homogeneously admixed with a fluorocarbon copolymer in the concentration indicated, improve both the melt flow and the toughness of the copolymer.

Various means known in the art may be employed to accomplish the plasticization of the fluorocarbon copolymers with the disclosed plasticizers. Thus, the plasticizer and polymer may be admixed with each other on calender rolls, such as are used in the compounding of rubber. Preferably, the plasticizer is added in the form of a dilute solution or dispersion to finely divided copolymer powder, as it is obtained on coagulation of an aqueous copolymer suspension. The solvent or dispersing medium is then volatilized and the copolymer is heated to above its melting point to cause solution of the plasticizer in the copolymer.

Fluorocarbon copolymers giving rise to improved compositions on plasticization with the fluoroalcohol esters of the cyclic polycarboxylic acids include the copolymers of tetrafluoroethylene and such substituted α-fluoroolefins as hexafluoropropene, perfluorobutene-1, perfluoroheptene-1, omega-hydroperfluoropentene-1, perfluorohexene-1, perfluorooctene-1, perfluoroisobutylene and omega-hydroperfluoroheptene-1. The concentration of the α-fluoroolefin comonomer in the copolymer varies, in general, from 1 to 30% depending on the comonomer employed.

Acids which on esterification with the fluoroalcohols result in plasticized compositions of improved properties are polycarboxylic acids in which the acid groups are attached to cycloaliphatic or aromatic hydrocarbon radicals. Acids which have been found to result in outstanding plasticizers are phthalic acid, terephthalic acid, pyromellitic acid, mellitic acid, camphoric acid and the like.

The carboxylic acids are esterified with fluoroalcohols to form the plasticizers of the present invention. As shown above, the fluoroalcohols have the general formula $HCF_2C_nF_{2n}CH_2OH$, and contain from 5 to 9 carbon atoms in the molecule. The fluoroalcohols employed to form the esters are prepared by the polymerization of tetrafluoroethylene in the presence of methanol which acts as a telogen and controls the degree of polymerization. The preparation of the alcohols is disclosed in greater detail in U.S. Patent 2,559,628, which issued to R. M. Joyce on July 10, 1951.

The improvement obtained with the plasticized compositions of the present invention is demonstrated by Table I, wherein plasticized and unplasticized compositions are compared with respect to their melt flow, as measured by specific melt viscosity and their toughness, as measured by folding endurance. The plasticized copolymer was prepared by admixing a copolymer of hexafluoropropylene and tetrafluoroethylene containing 15.4 weight percent of hexafluoropropylene, as obtained from the coagulation of an aqueous dispersion of the copolymer with a dispersion of the plasticizer, indicated in the table, in benzene. The mixture was blended until a uniform paste was obtained. The mixture was then heated to vaporize the benzene. Heating was continued for a period of 0.5 to 3 hours at a temperature of 300 to 350° C. to effect a solution of the plasticizer in the copolymer. The copolymer employed was prepared by the technique illustrated in Belgian Patent 560,454, issued to M. I. Bro et al. on September 14, 1957. The specific melt viscosity is obtained by measuring the apparent melt viscosity at 380° C. under a shear stress of 6.5 p.s.i. The values are obtained by using a melt indexer of the type described in ASTM test D–1238–52 T, modified for corrosion resistance to embody a cylinder, orifice, and 10 g. piston made of "Stellite" cobalt-chromium-tungsten alloy. The resin is charged to the 0.375 inch I.D. cylinder held at 380°±0.5° C., allowed to come to an equilibrium temperature during 5 minutes and extruded through the 0.0825 inch diameter, 0.315 inch long orifice under a piston loading of 5000 g. The specific viscosity in poises is calculated as 53,150 divided by the observed extrusion rate in grams per minute. The toughness, shown as folding endurance was measured by flexing a thin film, 5–8 mils, of the copolymer through an angle of 300° under a tensile stress of 1500 p.s.i. at 23° C. on a Tinius-Olson Folding Endurance Tester of the type developed at the Massachusetts Institute of Technology. The films were prepared by compression molding the copolymer at 310–340° C. under a pressure of 1000 to 2000 p.s.i. The plasticizers employed in the table were obtained by the esterification of camphoric acid and pyromellitic acid with a mixture of $CHF_2(CF_2)_nCH_2OH$ alcohols, where $n$ varied from 3 to 5. The results are, furthermore, compared to plasticization with a low molecular weight branched fluorocarbon polymer obtained by cracking tetrafluoroethylene and polymerizing the products. The concentration of the plasticizer in the composition was measured by removal of the plasticizer from the plasticized composition through volatilization.

TABLE I

| Plasticizer | Plasticizer Concentration in wt. percent | Specific Melt Viscosity in Poises $\times 10^{-4}$ | Folding Endurance in Cycles | X-ray Crystallinity |
|---|---|---|---|---|
| Fluoroalkyl camphorate | 0 | 19.7 | 15,630 | 40 |
| Fluoroalkyl camphorate | 4 | 7.2 | 22,935 | 42 |
| Fluoroalkyl camphorate | 12 | 4.2 | 31,876 | 38 |
| Fluoroalkyl camphorate | 15 | 3.5 | | |
| Fluoroalkyl pyromellitate | 0 | 13.88 | 6,786 | 40 |
| Fluoroalkyl pyromellitate | 2.7 | 7.44 | 11,900 | 42 |
| Fluoroalkyl pyromellitate | 5.8 | 5.85 | 14,500 | |
| Fluoroalkyl pyromellitate | 10 | 4.81 | 16,400 | 37 |
| Tetrafluoroethylene wax | 0 | 11.9 | 11,310 | |
| Tetrafluoroethylene wax | 8.5 | 5.7 | 5,624 | |

From the results, it can be seen that the maximum improvement in properties is obtained when the plasticizer is employed in a concentration of 1 to 10%. Although additional quantities of plasticizer result in further improvement in melt flow and toughness, the degree of improvement obtained decreases with increasing quantities of plasticizer. In general, it is not desirable to increase the concentration of the plasticizer beyond 40% of the copolymer. The table further points out that the type of plasticizer heretofore employed in the plasticization of halocarbon polymers, i.e., a low molecular weight, wax-type halocarbon polymer, results in plasticized compositions with the fluorocarbon copolymers of tetrafluoroethylene and substituted α-fluoroolefins which, although improved in melt flow, show a decrease in mechanical properties, such as toughness and are for that purpose not desirable.

The experimental data presented in the table demonstrates the nature of the improvement obtained through plasticization with some of the stabilizers disclosed in combination with a tetrafluoroethylene/hexafluoropropylene copolymer. It is to be understood that the table merely represents one specific embodiment of the invention. Plasticized fluorocarbon copolymers exhibiting a combination of improved melt flow and toughness are similarly obtained with fluorocarbon copolymers of the type described above and other fluoroalkyl esters of cyclic polycarboxylic acids when following the procedures outlined above, leading to the data presented in the table.

The plasticized compositions of the present invention are useful in a large number of industrial applications in the form of films, fibers and molded shapes. The higher melt flow of the plasticized compositions allows their fabrication at higher rates or lower temperatures.

I claim:
1. A composition of matter comprising a fluorocarbon copolymer of tetrafluoroethylene and a fluorinated α-olefin having the general formula $CF_2=CFC_nF_{2n}X$, wherein $n$ is an integer of 1 to 10 inclusive, and X is selected from the class consisting of hydrogen and fluorine, containing from 1 to 40%, based on the weight of the copolymer, of an ester of a polycarboxylic acid selected from the group consisting of cycloaliphatic and aromatic polycarboxylic acids having from 2 to 6 carboxylic acid groups and a fluoroalcohol having the general formula $HCF_2-C_nF_{2n}-CH_2OH$, $n$ being an integer of 3 to 7 inclusive.
2. The composition of matter as set forth in claim 1 wherein the fluorocarbon copolymer is a copolymer of tetrafluoroethylene and hexafluoropropylene.
3. The composition of matter as set forth in claim 2 wherein the polycarboxylic acid is camphoric acid.
4. The composition of matter as set forth in claim 2 wherein the polycarboxylic acid is pyromellitic acid.
5. The composition of matter comprising a copolymer of tetrafluoroethylene and hexafluoropropylene containing homogeneously admixed therewith from 1 to 10%, by weight of the copolymer, of fluoroalkyl pyromellitate, wherein the fluoroalkyl groups have the structure $-CH_2(CF_2)_nCF_2H$, $n$ being an integer of 3 to 5 inclusive.

References Cited in the file of this patent
UNITED STATES PATENTS
2,828,274    Shen Lo _____ Mar. 25, 1958